June 26, 1928.
F. C. McELROY
1,675,037
VEHICLE LAMP
Filed March 3, 1926          2 Sheets-Sheet 1
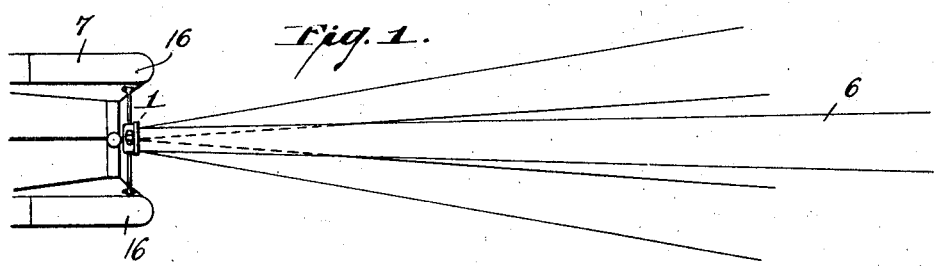
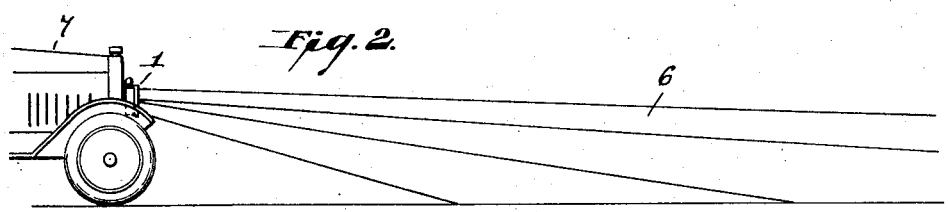
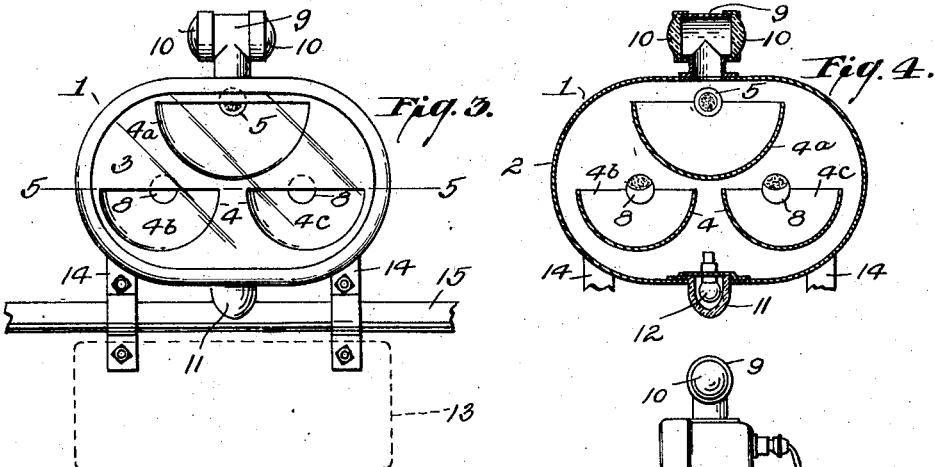
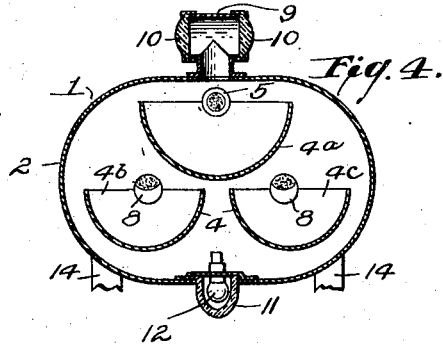
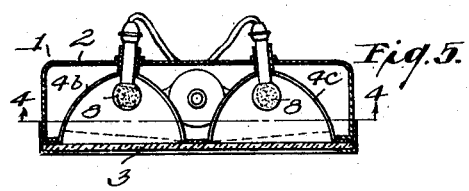
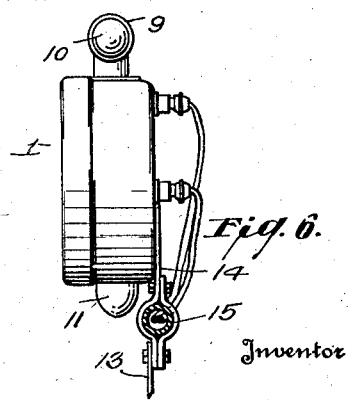
Inventor
Frank C. McElroy
By W. D. McDowell
Attorney June 26, 1928.
F. C. McELROY
1,675,037
VEHICLE LAMP
Filed March 3, 1926   2 Sheets-Sheet 2
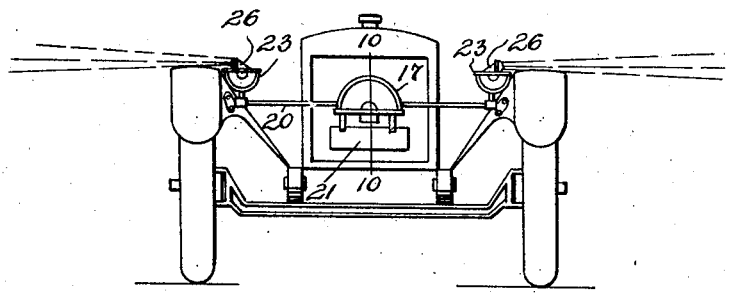
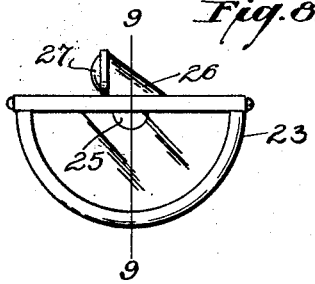
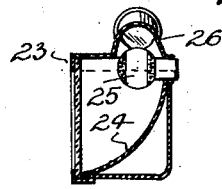
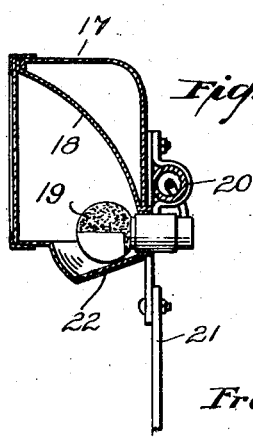
Inventor
Frank C. McElroy
By W. D. McDowell.
Attorney Patented June 26, 1928.

1,675,037

UNITED STATES PATENT OFFICE.

FRANK C. McELROY, OF COLUMBUS, OHIO.

VEHICLE LAMP.

Application filed March 3, 1926. Serial No. 92,033.

This invention relates to improvements in motor vehicle illumination, and has for its primary object the provision of a novel head light assembly, adapted to be carried by the front of a motor vehicle, which will serve the purpose of providing for the adequate and efficient illumination of the zones of travel preceding the vehicle, in a manner devoid of glare and danger to approaching motorists, and also to provide for the illumination of the zones to the right and left of the vehicle.

With these and other objects in view, as will appear as the description proceeds, the invention consists in the novel features of construction, combinations of elements and arrangements of parts hereinafter to be fully described and pointed out in the appended claim.

In the accompanying drawings:

Figure 1 is a plan view of a motor vehicle equipped with the improved lighting unit comprising the preferred form of the invention, Figure 2 is a side elevation thereof, Figure 3 is a front elevation of the lighting unit on a slightly enlarged scale, Figure 4 is a vertical sectional view therethrough, Figure 5 is a horizontal sectional view on the line 5—5 of Figure 3, Figure 6 is a side elevation, Figure 7 is a front elevation of a motor vehicle showing a slightly modified form of the illuminating means, Figure 8 is a front elevation of one of the side lighting units shown in Figure 7, Figure 9 is a vertical transverse sectional view on the line 9—9 of Figure 8, Figure 10 is a vertical sectional view on the line 10—10 of Figure 7.

As shown in the accompanying drawings, especially in Figures 1 to 6, my improved illumination system comprises a lighting unit 1, consisting of a casing 2 which in this instance is of substantially elliptical form. The open front of the casing is covered by a removable transparent lens 3, and aranged within the casing are a plurality of reflectors 4. The upper reflector $4^a$ has its principal axis provided with a light source 5 so arranged as to project the forwardly directed long range beam 6, indicated in Figures 1 and 2, a considerable distance in advance of the motor vehicle 7 upon which the lamp is mounted. Below the reflector $4^a$ there is provided reflectors $4^b$ and $4^c$, having the principal axes thereof arranged to diverge outwardly, as indicated in Figure 5, to provide for the side lighting of the vehicle, enabling the areas to the right and left of the vehicle to be illuminated properly and effectively to provide for the safe driving of the vehicle during periods of darkness. The reflectors $4^b$ and $4^c$ are provided with frosted or tinted translucent lamp bulbs 8 by which glare is removed and a greatly improved light produced. Also, experiments have disclosed that the reflectors $4^a$, $4^b$ and $4^c$ need not be of full annular form to produce adequate illumination and, as shown, the reflectors in this instance are each of but one half the usual size which provides for the compact grouping of said reflectors in the casing without appreciably diminishing the projected light, and, more important, providing a strong driving light characterized by its freedom from obnoxious glare.

The top of the lamp casing, arranged immediately over the bulb 5, is provided with a supplemental housing 9 having spaced lenses 10 arranged in the opposite ends thereof, which serve to produce signal lights, visible from the sides of the vehicle 7 so as to indicate the direction of travel of the vehicle to lateral observers. Similarly, the bottom of the casing is provided with an opening for the reception of a depending lens 11 in which is arranged a light source 12. By this construction the license plate 13 of the vehicle is illuminated and also the front wheels, providing a parking light by which the front of the vehicle may be observed. The casing of the lamp is preferably provided with brackets 14 adapted for connection with the transversely extending rod 15 employed in bracing and uniting the front fender 16 of the vehicle. By this construction the lamp may be placed immediately in front of the radiator of the vehicle and in the true longitudinal center of the latter, dispensing with the plurality of lamp casings of conventional form.

It will thus be seen that the single lamp casing provides for a strong long range light beam, laterally disposed spreading light beams, laterally directed signal lights, and a depending license plate illuminating and parking light. All of these lights may be of course selectively operated at will through the employment of any suitable switch mechanism.

As shown in Figures 7 to 10 inclusive a central lamp casing 17 is provided carrying a single reflector 18 in the principal axis of which is arranged an incandescent bulb 19. The lamp 17 is connected to the transversely extending fender rod 20 and also carries a license plate 21. The bottom of the casing 17 is provided with a transparent opening 22, enabling the single light bulb 19 to serve the double capacity of producing, first, a long range light beam of great power, and second, a parking light by which the front of the vehicle is illuminated as well as the forwardly disposed license tag.

In this modified form of the invention, however, the rod 20 and its outer ends carry supplemental lamps 23, each of which includes a casing provided with a reflector 24 and a source of light 25. The reflectors 24 are preferably set, as indicated in Figure 5, with their principal axes in diverging relation, so as to illumine the sides of the vehicle as well as the area preceding the same.

In this instance the lamps 23 are provided with upwardly disposed housings 26 provided with colored signal lenses 27, so that when the lamps 23 are in use the same will serve to emit the forwardly directed light beams and also the laterally directed signal beams.

I employ a semi-parabolic reflector for the express purpose that there will be no rays projected upwardly from the lamp when the latter is used in combination with a bulb having the so called "straight line" focus, when the reflector half is located in the lower part of the lamp shell. If the reflector half is located in the upper part of the lamp shell then with the employment of the so called "cross line" focus there will be no upward rays reflected. Thus by this construction an important improvement is effected through the entire elimination of upwardly projected rays.

What is claimed is:

A vehicle head lamp comprising a casing, a main reflector of semi-parabolic type positioned within said casing and having its reflecting surface below the principal axis thereof, an incandescent lamp in said axis and operating to produce a forwardly directed long range light beam, a pair of secondary reflectors in said casing of similar construction to that of the main reflector and arranged in a downwardly and diverging relationship with respect to the long range light beam, incandescent lamps in said secondary reflectors, all of said reflectors being so mounted in the casing that the open ends thereof lie in the same plane, a wall in front of said reflectors having openings formed therein conforming to the shape of the open ends of said reflectors, and a lens for closing the open ends of said reflectors and secured to said casing.

In testimony whereof I affix my signature.

FRANK C. McELROY.